US012612743B2

(12) United States Patent
Dagner et al.

(10) Patent No.: US 12,612,743 B2
(45) Date of Patent: Apr. 28, 2026

(54) SOIL PROCESSING ROLLER AND METHOD FOR OPERATING A SOIL PROCESSING ROLLER

(71) Applicant: Hamm AG, Tirschenreuth (DE)

(72) Inventors: Josef Dagner, Altenstadt (DE); Stefan Braunschläger, Bärnau (DE); Stefan Bäuml, Tirschenreuth (DE)

(73) Assignee: HAMM AG, Tirschenreuth (DE)

( * ) Notice: Subject to any disclaimer, the term of this patent is extended or adjusted under 35 U.S.C. 154(b) by 785 days.

(21) Appl. No.: 17/987,996

(22) Filed: Nov. 16, 2022

(65) Prior Publication Data

US 2023/0160154 A1 May 25, 2023

(30) Foreign Application Priority Data

Nov. 19, 2021 (DE) ..................... 10 2021 130 259.5

(51) Int. Cl.
*E01C 19/28* (2006.01)
*B06B 1/16* (2006.01)

(52) U.S. Cl.
CPC .............. *E01C 19/286* (2013.01); *B06B 1/16* (2013.01)

(58) Field of Classification Search
CPC ................................ E01C 19/286; B06B 1/16
(Continued)

(56) References Cited

U.S. PATENT DOCUMENTS 3,029,715 A * 4/1962 Bowen .................. E01C 19/486 404/84.1
3,670,631 A * 6/1972 Gaylor .................. E01C 19/286 74/61
(Continued)

FOREIGN PATENT DOCUMENTS

CN 104480839 4/2015
CN 205711641 U 11/2016
(Continued)

OTHER PUBLICATIONS

Office action filed in CN202211448193.8 dated Apr. 26, 2025.
(Continued)

*Primary Examiner* — Raymond W Addie
(74) *Attorney, Agent, or Firm* — RANKIN, HILL & CLARK LLP

(57) ABSTRACT

A soil processing roller for a soil processing machine includes a roller shell elongated in the direction of a roller axis of rotation and surrounding a roller interior and an unbalanced arrangement arranged at least partially in the roller interior. The unbalanced arrangement includes at least one unbalanced mass rotatable around an unbalanced axis of rotation having center of mass eccentric to the unbalanced axis of rotation and an unbalanced drive system having at least one unbalanced electric drive motor for driving the at least one unbalanced mass to rotate around the unbalanced axis of rotation. The at least one unbalanced mass is in an idle position when the unbalanced arrangement is deactivated, and the unbalanced drive system is designed, upon deactivation of the unbalanced arrangement, to operate the at least one unbalanced electric drive motor in an unbalanced return phase such that the at least one unbalanced mass is moved into the idle position.

14 Claims, 1 Drawing Sheet

(58) Field of Classification Search
USPC .................................... 404/84.05–84.5, 117
See application file for complete search history.

(56) References Cited

U.S. PATENT DOCUMENTS

| | | | | |
|---|---|---|---|---|
| 4,262,579 A * | 4/1981 | Harris | F01B 17/04 91/480 |
| 6,224,293 B1 | 5/2001 | Smith | |
| 6,837,648 B1 * | 1/2005 | Wadensten | E01C 19/283 404/117 |
| 8,585,317 B1 * | 11/2013 | Sina | E02D 3/074 404/117 |
| 2003/0082003 A1 * | 5/2003 | Potts | E02D 3/074 404/117 |
| 2012/0155961 A1 * | 6/2012 | Norton | E02D 3/02 404/117 |
| 2016/0069238 A1 | 3/2016 | Brück et al. | |

FOREIGN PATENT DOCUMENTS

| | | | | |
|---|---|---|---|---|
| CN | 219862224 U | 10/2023 | |
| DE | 10 2019 002 439 | 10/2020 | |
| JP | 107197415 | 8/1995 | |
| JP | 2016194218 | 11/2016 | |
| JP | 2017214820 | 12/2017 | |
| SU | 1454515 A1 | 1/1989 | |
| WO | WO-2020174261 A1 * | 9/2020 | B60R 16/033 |
| WO | 2020200509 | 10/2020 | |
| WO | 2020200509 A1 | 10/2020 | |
| WO | WO-2023199835 A1 * | 10/2023 | B60K 1/04 |

OTHER PUBLICATIONS

Search report filed in CN2022114481938 dated Nov. 19, 2021.
European Search Report filed in 22202044.8, dated Mar. 17, 2023, 7 pages.
German Search Report filed in 10 2021 130 259.5 dated Oct. 11, 2022.

* cited by examiner

SOIL PROCESSING ROLLER AND METHOD FOR OPERATING A SOIL PROCESSING ROLLER

The present invention relates to a soil processing roller which can be used in a soil processing machine, for example a soil compactor, to process soil, in particular to compact it. The invention furthermore relates to a method for operating such a soil processing roller or a soil processing machine having such a soil processing roller.

A soil processing roller, which can be used as a compactor roller in a soil processing machine constructed as a soil compactor, for example, can have an unbalanced arrangement having at least one unbalanced mass rotatable around an unbalanced axis of rotation. If the unbalanced axis of rotation corresponds to the axis of rotation of the soil processing roller, the at least one rotating unbalanced mass exerts a force oriented orthogonally to the axis of rotation on the soil processing roller and the soil processing roller is thus set into a periodic vibration movement that is essentially orthogonal to the axis of rotation of the soil processing roller. If, for example, two unbalanced masses are provided, having unbalanced axes of rotation that are offset and arranged in parallel to the axis of rotation of the soil processing roller and are diametrically opposite to one another with respect to the axis of rotation of the soil processing roller, the rotating unbalanced weights can exert a periodically changing torque on the soil processing roller that is oriented essentially tangentially with respect to the axis of rotation of the soil processing roller, to set the soil processing roller into a periodic oscillating movement.

In order to avoid the use of fossil fuels in such soil processing machines or to reduce the consumption of fossil fuels, an unbalanced electric drive motor can be provided assigned to a soil processing roller, by which the at least one unbalanced mass can be driven to rotate. When the unbalanced arrangement is deactivated and the unbalanced electric drive motor is therefore not excited, it generates neither a drive torque nor a braking torque, so that an unbalanced mass that is fundamentally to be driven to rotate by it will position itself in an idle position of minimal potential energy, in which the center of mass of such an unbalanced mass is positioned essentially vertically under the unbalanced axis of rotation. An unbalanced mass will move into this idle position if, starting from an operating state in which the unbalanced mass rotates at an operating speed around the associated unbalanced axis of rotation, the assigned unbalanced electric drive motor is deactivated. At the end of the transition into the idle state or the movement into the idle position, an unbalanced mass, which is generally not subjected to a braking torque, oscillates around the idle position at a comparatively low frequency and with decreasing amplitude, which is perceptible by a corresponding oscillation on the soil processing roller or soil processing machine.

It is the object of the present invention to provide a soil processing roller for a soil processing machine and a method for operating such a soil processing roller, using which the occurrence of a pendulum movement of an unbalanced mass upon the deactivation of an unbalanced arrangement, i.e., upon the transition into an idle state, can be avoided.

According to a first aspect of the present invention, this object is achieved by a soil processing roller for a soil processing machine, in particular a soil compactor, comprising a roller shell which is elongated in the direction of a roller axis of rotation and surrounds a roller interior and an unbalanced arrangement which is arranged at least partially in the roller interior, wherein the unbalanced arrangement comprises at least one unbalanced mass rotatable around an unbalanced axis of rotation having center of mass eccentric to the unbalanced axis of rotation and an unbalanced drive system having at least one unbalanced electric drive motor for driving the at least one unbalanced mass to rotate around the unbalanced axis of rotation, wherein the at least one unbalanced mass is essentially in an idle position when the unbalanced arrangement is deactivated, wherein the unbalanced drive system is designed, upon deactivation of the unbalanced arrangement, to operate the at least one unbalanced electric drive motor in an unbalanced return phase in such a way that the at least one unbalanced mass is moved into the idle position.

In a soil processing roller constructed according to the invention, an unbalanced mass is prevented from oscillating upon deactivation of the unbalanced arrangement, i.e., upon the transition into a idle state, in that the at least one unbalanced mass is moved in a defined manner into the idle position, i.e., the state of minimum potential energy, by corresponding operation of the unbalanced electric drive motor. There is no pendulum movement, rather the at least one unbalanced mass is moved from a state of higher potential energy, thus a state in which the center of mass of the at least one unbalanced mass is higher than in the idle position, in a substantially continuous lowering movement in the direction of the idle position.

In this case, the unbalanced drive system can be designed to move the at least one unbalanced mass from a deflected position into the idle position upon deactivation of the unbalanced arrangement. The at least one unbalanced mass is thus brought into the state of lower or minimum potential energy by operating the associated unbalanced electric drive motor between two positions, namely the deflection position on the one hand and the idle position on the other hand.

In the idle position, the center of mass of the at least one unbalanced mass can be positioned essentially vertically below the unbalanced axis of rotation in a vertical direction, thus assume the state of minimum potential energy, while in the deflection position the center of mass of the at least one unbalanced mass can be deflected at a deflection angle out of the idle position.

In order to be able to initiate a defined movement of the at least one unbalanced mass at the beginning of the unbalanced return phase, it is proposed that the unbalanced drive system be designed, upon deactivation of the unbalanced arrangement, in particular upon beginning of the unbalanced return phase, to operate the at least one unbalanced electric drive motor to generate a holding torque.

For this purpose, for example, the unbalanced drive system can be designed to conduct a holding current through the at least one unbalanced electric drive motor in order to generate the holding torque.

In order to transfer the at least one unbalanced mass, starting from normal rotational operation, into a state in which, in the unbalanced return phase, it is moved back to the idle position without any significant oscillating movement, the unbalanced drive system can be designed, in a braking phase preceding the unbalanced return phase, to operate the unbalanced electric drive motor to generate a braking torque to reduce a speed of the at least one unbalanced mass, starting from an operating speed. In particular, this unbalanced braking phase can be used to move the at least one unbalanced mass into the deflection position or to position it in the region of the deflection position, so that the at least one unbalanced mass essentially comes to rest in the deflection position.

In order to keep the unbalanced braking phase as short as possible, it is proposed that the braking torque be greater than the holding torque. For example, the braking torque can be in the range of the maximum braking torque that can be generated by the unbalanced electric drive motor.

To initiate the unbalanced return phase, the unbalanced drive system can be designed to operate the at least one unbalanced electric drive motor to generate the holding torque when a transition speed is reached and/or when a predetermined braking duration has elapsed since the beginning of the unbalanced braking phase.

The transition speed can be zero, for example. This means that in the unbalanced braking phase, the at least one unbalanced mass is practically brought to a standstill and at the end of the unbalanced braking phase it is positioned in the deflection position or only executes a movement at very low velocity in the region of the deflection position.

Since it is generally not known in which deflection position at the end of the unbalanced braking phase the at least one unbalanced mass will be brought to a standstill or almost to a standstill, it is advantageous if the holding torque corresponds to a torque generated by the at least one unbalanced mass upon positioning of the at least one unbalanced mass at a reference deflection angle, wherein preferably the reference deflection angle is in the range of 90° with respect to the idle position. In this way, the at least one unbalanced mass is prevented from suddenly falling down because the holding torque is too low.

In order to move the at least one unbalanced mass into the idle position in the unbalanced return phase, the unbalanced drive system can be designed, with at least one unbalanced mass positioned in the deflection position, to operate the at least one unbalanced electric drive motor to lower the torque generated by the at least one unbalanced electric drive motor, starting from the holding torque.

The lowering of the torque, starting from the holding torque, can be achieved, for example, by the unbalanced drive system being designed to lower the current conducted through the unbalanced electric drive motor, starting from the holding current.

To generate a vibration movement of a soil processing roller, the unbalanced axis of rotation of at least one unbalanced mass, preferably each unbalanced mass, can correspond to the roller axis of rotation. If a soil processing roller is to be set into an oscillating movement, it can alternatively or additionally be provided that the unbalanced axis of rotation of at least one unbalanced mass, preferably each unbalanced mass, is arranged offset and in parallel to the roller axis of rotation.

The invention furthermore relates to a soil processing machine, preferably a soil compactor, comprising at least one soil processing roller constructed according to the invention.

Furthermore, the object specified at the outset is achieved by a method for operating a soil processing roller constructed according to the invention, preferably in a soil processing machine constructed according to the invention, comprising the measures:

a) upon deactivation of the unbalanced arrangement, lowering the speed of the at least one unbalanced mass in an unbalanced braking phase, starting from an operating speed, b) in an unbalanced return phase following the unbalanced braking phase, generating a holding torque by way of the at least one unbalanced electric drive motor and reducing the torque generated by the unbalanced electric drive motor, starting from the holding torque, to move the at least one unbalanced mass into the idle position.

The invention is described in detail below with reference to the attached figures. In the figures.

Figure 1:
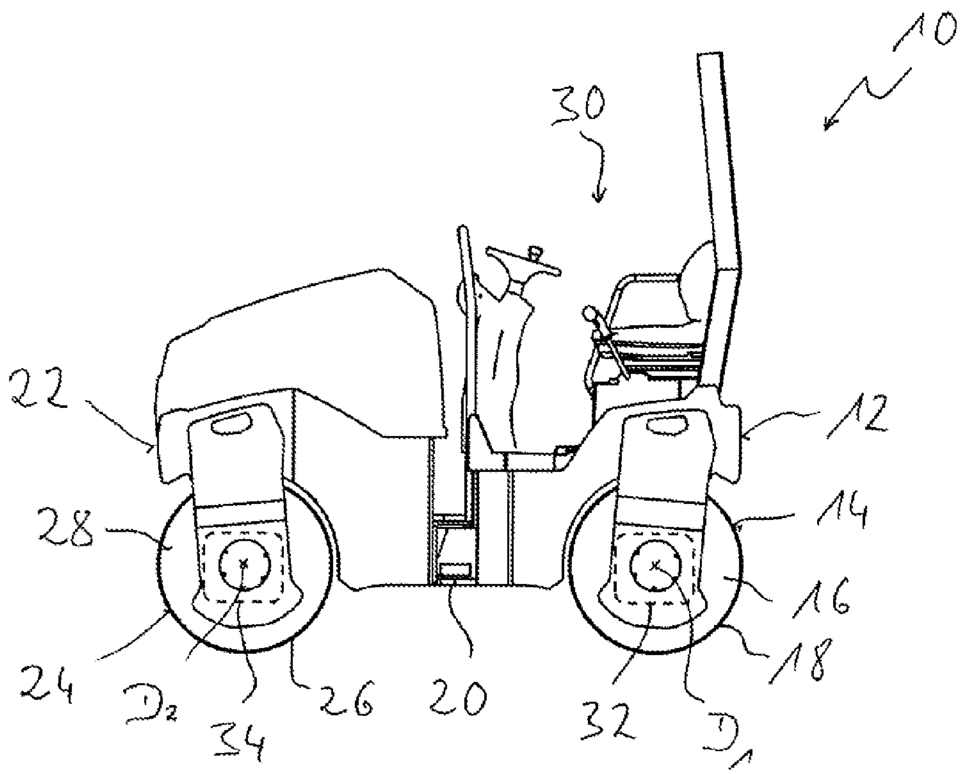
FIG. 1 shows a side view of a soil processing machine designed as a soil compactor.

In FIG. 1, a soil processing machine designed as a soil compactor is generally designated by 10. The soil processing machine 10 comprises, on a rear carriage 12, a soil processing roller 14, which is rotatable around a roller axis of rotation $D_1$ and has a roller shell 18 enclosing a roller interior 16. On a front carriage 22 connected in an articulated manner in an articulated connection region 20 to the rear carriage 12 to steer the soil processing machine 10, the soil processing machine 10 has a further soil processing roller 24 having a roller interior 28 enclosed by a roller shell 26. Furthermore, a control station 30 is provided on the rear carriage 12, from which an operator can operate the soil processing machine 10, for example, to move it over soil to be compacted, such as asphalt material.

In the soil processing machine 10, both soil processing rollers 14 can be driven to rotate around their roller axes of rotation $D_1$, $D_2$. For this purpose, for example, an electro-hydraulic drive system having a traction hydraulic pump driven by an electric motor and a traction hydraulic motor assigned to each soil processing roller 14 can be provided.

Furthermore, in association with at least one soil processing roller, preferably both soil processing rollers, an unbalanced arrangement 32, 34 shown in principle by a dashed line in FIG. 1 can be provided. The structure and mode of operation of such an unbalanced arrangement are described in detail below with reference to the unbalanced arrangement 32 assigned to the soil processing roller 14 of the rear carriage 12. It is to be noted that if such unbalanced arrangements 32 or 34 are provided for both soil processing rollers 14, 24, they can be constructed identically to one another and can be operated in the same way.

The unbalanced mass arrangement 32 assigned to the soil processing roller 14 comprises at least one unbalanced mass 36 drivable to rotate around an unbalanced axis of rotation U corresponding to the roller axis of rotation $D_1$ in the example shown, with a center of mass M that is eccentric to the unbalanced axis of rotation U. It is to be noted that in FIG. 2, the unbalanced mass 36 is shown positioned in two rotational positions explained hereinafter around the unbalanced axis of rotation U. It is also to be pointed out that, for example, multiple such unbalanced masses 36 can be arranged in succession in the roller interior 16 in the direction of the unbalanced axis of rotation U.

The unbalanced mass 36 is assigned, for example, to an unbalanced electric drive motor 38 also arranged in the roller interior 16. This can be supplied from a battery, a fuel cell, or the like provided on the soil compactor 10 and can drive the assigned unbalanced mass 36 to rotate about the unbalanced axis of rotation U during soil processing operation, for example when compacting asphalt material or the like. In this context, it is to be noted that the unbalanced electric drive motor 38 can be provided to drive multiple unbalanced masses 36 arranged in succession in the direction of the unbalanced axis of rotation U, for example. Alternatively, if multiple such unbalanced masses 36 are provided, a separate unbalanced electric drive motor 38 driving it could be provided assigned to each such unbalanced mass 36. The unbalanced electric drive motor 38 is preferably a three-phase electric motor which is under the control of an inverter and is supplied with the respective required voltage or the respective required current by means of the inverter for rotation at a target speed or a target torque.

In operation of the soil processing machine 10 and with the unbalanced arrangement 32 activated, i.e., put into operation, the unbalanced electric drive motor 38 drives the unbalanced mass 36 to rotate around the unbalanced axis of rotation U at up to several thousand revolutions per minute. As a result, a force that is essentially orthogonal with respect to the roller axis of rotation $D_1$ is exerted on the soil processing roller 14 and sets it in a periodic vibration movement.

If the operation of the unbalanced arrangement 32 is to be ended, i.e., if it is deactivated, the speed of the unbalanced mass 36 around the unbalanced axis of rotation U is first lowered, for example, at the beginning of the deactivation in an unbalanced braking phase. For this purpose, for example, the unbalanced electric drive motor 38 can be operated as a generator in order to gain electrical energy from the decreasing kinetic energy of the unbalanced mass 36 and to feed this into an energy store, i.e., for example, a battery provided on the soil processing machine 10. Alternatively, the unbalanced electric drive motor 38 can be operated in a braking mode, in which a braking torque counteracting the rotation of the unbalanced mass 36 is generated by energizing it. In principle, the unbalanced electric drive motor 38 could also be operated in generator mode or in braking mode in different partial phases of the unbalanced braking phase. In order to keep the unbalanced braking phase as short as possible, the unbalanced electric drive motor 38 can be controlled in the unbalanced braking phase, for example, to generate a maximum possible braking torque, with the further specification that a speed in the range of zero is to be reached as the target speed.

At the end of the unbalanced braking phase, i.e., upon reaching a transition speed in the range of zero, the unbalanced mass 36 is in a fundamentally unknown deflection position. The unbalanced mass 36 or its center of mass could be in an idle position illustrated below in FIG. 2, in which the center of mass M of the unbalanced mass 36 is positioned essentially vertically under the roller axis of rotation $D_1$. In general, however, the unbalanced mass 36 will be positioned at the end of the unbalanced braking phase in a deflection position that does not correspond to the idle position and would be held in this deflection position if the unbalanced electric drive motor 38 was controlled further, with the proviso that the target speed of the unbalanced mass 36 is to be zero.

In the case of the unbalanced mass 36 driven to rotate by the unbalanced electric drive motor 38, information about the instantaneous speed of the unbalanced mass 36 or the unbalanced electric drive motor 38 is generally available, for example, from the control of the unbalanced electric drive motor 38 or provided by a speed sensor. If the speed of the unbalanced mass 36, which has been lowered starting from the operating speed, reaches the transition speed, which can, for example, correspond to the target speed specified for the unbalanced braking phase in the range of zero, or if a sufficiently long duration has passed since the start of the unbalanced braking phase, which ensures the unbalanced mass 36 has come to rest in a deflection position that does not correspond to the idle position, an unbalanced drive system 40 comprising, for example, the unbalanced electric drive motor 38 and an associated control unit, enters an unbalanced return phase in order to prevent the unbalanced mass 36 from swinging back and oscillating. If, in such a state, the unbalanced electric drive motor 38 were completely deactivated, i.e., de-energized, with the unbalanced mass 36 initially held in a deflection position, the unbalanced mass would execute a pendulum movement around the unbalanced axis of rotation U, i.e., no longer move past a top dead center of the circular movement. This pendulum movement would continue with decreasing amplitude until the unbalanced mass 36 assumes the position shown at the bottom in FIG. 2, in which the center of mass M of the unbalanced mass 36 is positioned in the direction of a vertical line V, i.e., in the direction of gravity, directly, i.e., vertically below the unbalanced axis of rotation U. The unbalanced mass 36 is or remains in this positioning, which corresponds to the idle position of the unbalanced mass 36, even when the unbalanced arrangement 32 is deactivated or the unbalanced drive system 40 is deactivated.

In order to avoid this pendulum movement of the unbalanced mass 36, which results in perceptible vibrations on the soil processing machine 10, the unbalanced electric drive motor 38 is energized during the transition into the unbalanced return phase in such a way that it generates a defined holding torque. The holding torque is generally less than the maximum braking torque that is generated or that can be generated in the unbalanced braking phase and is defined, for example, in such a way that, generally when the holding torque is generated by the unbalanced electric drive motor 38, the unbalanced mass 36 can remain positioned or be held in the deflection position deflected from the idle position. For this purpose, it can be provided, for example, that a torque is generated as the holding torque, which is sufficiently large that even if the deflection position has a reference deflection angle of 90° with respect to the idle position, the unbalanced mass 26 will not move in the direction of the idle position. In this deflection position, the unbalanced mass 36 is positioned in such a way that the center of mass M thereof lies on a horizontal line H intersecting the unbalanced axis of rotation U. This is a state in which, due to a maximum effective lever E between the unbalanced axis of rotation U and the center of mass M in the gravitational field, the unbalanced mass 36 generates a maximum torque counteracting or corresponding to the holding torque.

If the unbalanced electric drive motor 38 generates such a holding torque at the beginning of the unbalanced return phase, the unbalanced mass will initially remain in the deflected position. Starting from this state, the torque generated by the unbalanced drive electric motor 38 is then gradually lowered in the unbalanced return phase, starting from the holding torque. This is done by lowering the electrical current conducted through the unbalanced electric drive motor 38. Due to the linearly lowered torque or current, for example, the unbalanced mass 36 will, starting from the deflection position initially assumed, gradually move downwards towards the idle position and this mass will be in the idle position when the torque generated by the unbalanced electric drive motor 38 has been lowered to a value of zero.

When the torque provided by the unbalanced electric drive motor 38 has been lowered from the holding torque to a value of zero, the unbalanced mass 36 is gradually and essentially continuously returned to the idle position without pendulum movement, so that essentially no overshoot or movement beyond the idle position takes place. The unbalanced mass 36 is therefore returned to the idle position without a pendulum movement perceptible on the soil processing machine 10. If this state is reached, the operation of the unbalanced drive system 40 is stopped or the unbalanced electric drive motor 38 is no longer subjected to a voltage, so that it is de-energized and does not generate any torque acting on the unbalanced mass 36. Due to the force of gravity, the unbalanced mass 36 will remain in its idle position, in which it or its center of mass M assumes the position of minimum potential energy.

A particular advantage of the embodiment according to the invention of a soil processing roller 14 or 24 is that the transfer of an unbalanced mass 36 into an idle position can take place independently of whether the soil processing machine 10 is standing on ground that is oriented horizontally in the gravitational field or on inclined ground. In the idle position and with the unbalanced electric drive motor 38 deactivated, the unbalanced mass 36 will always assume the state of lowest potential energy, in which its center of mass M is positioned vertically, thus in the direction of gravity below the axis of rotation U of the unbalanced mass. No sensors are required to provide information about the inclination of the ground on which the soil treatment machine 10 is located.

Figure 2:
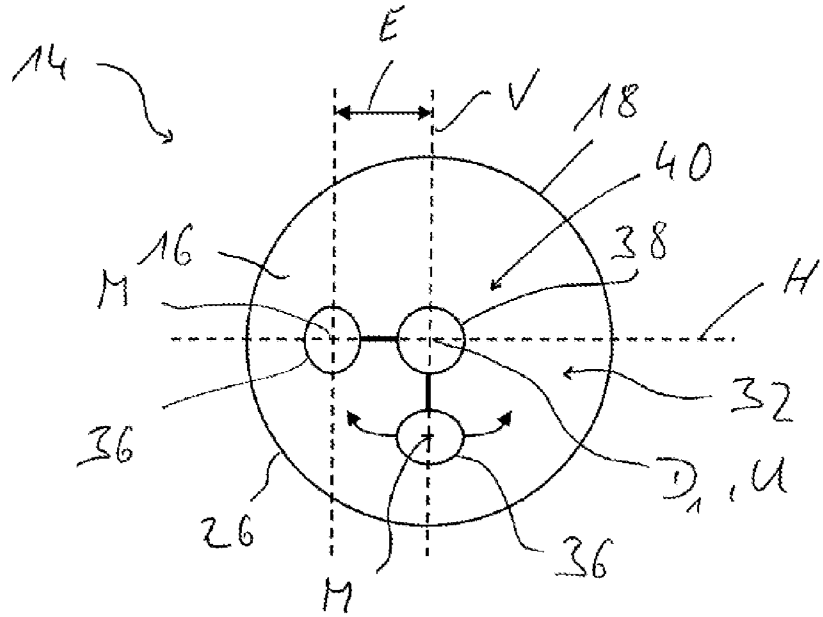
FIG. 2 shows a schematic illustration of a soil processing roller having an unbalanced arrangement assigned to it.

Finally, it is to be noted that in a soil processing roller 14, 24 constructed according to the invention or a method for the operation thereof, the holding torque to be generated by the unbalanced electric drive motor 38 can also be less, for example, than that for holding an unbalanced mass 36 in the state illustrated in FIG. 2 with maximum holding torque required by this generated torque. As a result, the duration of the unbalanced return phase can be shortened. In principle, the duration of the unbalanced return phase can also be shortened in that, for example, deviating from linear lowering of the torque, starting from the holding torque, the torque or the current conducted through the unbalanced electric drive motor 38 is lowered faster initially at the beginning of the unbalanced return phase than at the end of the unbalanced return phase. In principle, there can also be phases in the unbalanced return phase in which the torque provided by the unbalanced electric drive motor 38 is temporarily reduced to zero or a value in the range of zero, in order in this way to temporarily achieve a faster approach of the unbalanced mass 36 to the idle position.

It is also to be pointed out that the holding torque at the beginning of the unbalanced return phase is generated in the direction around the unbalanced axis of rotation U which ensures that the unbalanced mass 36 does not fall back into the idle position or is accelerated in the direction of the idle position. When the unbalanced mass 36 is positioned in the deflection position shown in FIG. 2, the holding torque is therefore generated clockwise. If the unbalanced mass 36 were positioned to the right of the unbalanced axis of rotation U in FIG. 2, the holding torque would be generated counterclockwise.

Finally, it is also to be noted that the principles of the present invention can be used not only in an unbalanced arrangement provided for generating a vibration movement, but also, for example, in an unbalanced arrangement in which, for example, two unbalanced masses having an unbalanced axis of rotation that is offset and in parallel to the roller axis of rotation, for example, are arranged diametrically opposite to one another with respect to the roller axis of rotation, for example. Even with such unbalanced axes of rotation that are eccentric to the roller axis of rotation, the unbalanced masses will position themselves in the state of minimum potential energy when the unbalanced electric drive motor is not activated or the unbalanced electric drive motors are not activated. The procedure described above can also be used to avoid a pendulum movement of the unbalanced masses in such arrangements.

The invention claimed is:

1. A soil processing roller for a soil processing machine, comprising a roller shell which is elongated in the direction of a roller axis of rotation and surrounds a roller interior and an unbalanced arrangement which is arranged at least partially in the roller interior, wherein the unbalanced arrangement comprises at least one unbalanced mass rotatable around an unbalanced axis of rotation having center of mass eccentric to the unbalanced axis of rotation and an unbalanced drive system having at least one unbalanced electric drive motor for driving the at least one unbalanced mass to rotate around the unbalanced axis of rotation, wherein the at least one unbalanced mass is in an idle position when the unbalanced arrangement is deactivated, wherein in the idle position, the center of mass of the at least one unbalanced mass is positioned vertically below the unbalanced axis of rotation in a vertical direction, wherein the unbalanced drive system is configured, upon deactivation of the unbalanced arrangement, to operate the at least one unbalanced electric drive motor in an unbalanced return phase in such a way that the at least one unbalanced mass is moved into the idle position, wherein the unbalanced drive system is configured to move the at least one unbalanced mass from a deflected position into the idle position in the unbalanced return phase, wherein in the deflection position, the center of mass of the at least one unbalanced mass is deflected at a deflection angle from the idle position, wherein the unbalanced drive system is configured to operate the at least one unbalanced electric drive motor to generate a decreasing torque by subjecting the unbalanced electric drive motor to a voltage so as to lower an electric current conducted through the unbalanced electric drive motor in the unbalanced return phase for gradually moving the at least one unbalanced mass from the deflected position into the idle position.

2. The soil processing roller in claim 1, wherein the unbalanced drive system is configured, upon deactivation of the unbalanced arrangement, to operate the at least one unbalanced electric drive motor to generate a holding torque, and the unbalanced drive system is configured with at least one unbalanced mass positioned in the deflection position, to operate the at least one unbalanced electric drive motor to lower the torque generated by the at least one unbalanced electric drive motor, starting from the holding torque, to move the at least one unbalanced mass from the deflection position into the idle position.

3. The soil processing machine in claim 1, wherein the unbalanced axis of rotation of at least one unbalanced mass corresponds to the roller axis of rotation, and/or in that the unbalanced axis of rotation of at least one unbalanced mass is arranged offset and in parallel to the roller axis of rotation.

4. The soil processing roller as in claim 1, wherein the unbalanced drive system is configured, upon deactivation of the unbalanced arrangement, to operate the at least one unbalanced electric drive motor to generate a holding torque.

5. The soil processing roller in claim 4, wherein the unbalanced drive system is designed to conduct a holding current through the at least one unbalanced electric drive motor to generate the holding torque.

6. The soil processing roller in claim 5, wherein the unbalanced drive system is configured to lower the torque generated by the at least one unbalanced electric drive motor, to lower the current conducting through the unbalanced electric drive motor, starting from the holding current.

7. The soil processing machine in claim 4, wherein the holding torque corresponds to a torque generated by the at least one unbalanced mass when the at least one unbalanced mass is positioned at a reference deflection angle.

8. The soil processing roller in claim 7, wherein in the idle position, the center of mass of the at least one unbalanced mass is positioned vertically below the unbalanced axis of rotation in a vertical direction, and in that, in the deflection position, the center of mass of the at least one unbalanced mass is deflected at a deflection angle from the idle position, the reference deflection angle is in the range of 90° with respect to the idle position.

9. The soil processing machine in claim 1, wherein the unbalanced drive system is configured, in an unbalanced braking phase preceding the unbalanced return phase, to operate the unbalanced electric drive motor to generate a braking torque to lower a speed of the at least one unbalanced mass, starting from an operating speed.

10. The soil processing machine in claim 9, wherein the unbalanced drive system is configured, upon deactivation of the unbalanced arrangement, to operate the at least one unbalanced electric drive motor to generate a holding torque, and the braking torque is greater than the holding torque.

11. The soil processing machine in claim 9, wherein the unbalanced drive system is configured, upon deactivation of the unbalanced arrangement, to operate the at least one unbalanced electric drive motor to generate a holding torque, and the unbalanced drive system is configured to operate the at least one unbalanced electric drive motor to generate the holding torque when a transition speed is reached and/or when a predetermined braking duration has elapsed since the beginning of the unbalanced braking phase.

12. The soil processing roller in claim 11, wherein the transition speed is zero.

13. A soil processing machine comprising at least one soil processing roller in claim 1.

14. A method for operating a soil processing roller in claim 13, comprising:

a) upon deactivation of the unbalanced arrangement, lowering the speed of the at least one unbalanced mass in an unbalanced braking phase, starting from an operating speed, b) in an unbalanced return phase following the unbalanced braking phase, generating a holding torque by way of the at least one unbalanced electric drive motor and reducing the torque generated by the unbalanced electric drive motor, starting from the holding torque, to move the at least one unbalanced mass in the idle position.

* * * * *